United States Patent [19]
Heimbach et al.

[11] 3,931,014
[45] Jan. 6, 1976

[54] FILTER PLATE-AND-DIAPHRAGM ASSEMBLIES FOR A FILTER PRESS

[75] Inventors: Franz Heimbach; Alfons Schotten, both of Duren, Germany

[73] Assignee: Eberhard Hoesch & Soehne, Duren, Germany

[22] Filed: Apr. 29, 1974

[21] Appl. No.: 465,364

[30] Foreign Application Priority Data
May 2, 1973 Germany............................ 2322044

[52] U.S. Cl. ............................................... 210/231
[51] Int. Cl.² .......................................... B01D 25/12
[58] Field of Search .......... 210/224, 227, 228, 229, 210/230, 231; 285/DIG. 18, DIG. 20, DIG. 22

[56] References Cited
UNITED STATES PATENTS

| | | | |
|---|---|---|---|
| 459,488 | 9/1891 | Johnson et al. ...................... | 210/231 |
| 2,989,187 | 6/1961 | Demeter ............................ | 210/227 |
| 3,221,883 | 12/1965 | Lennstrom ...................... | 210/231 X |
| 3,289,845 | 12/1966 | Weber ............................ | 210/231 |
| 3,503,326 | 3/1970 | Juhasz et al. .................... | 210/229 X |
| 3,543,938 | 12/1970 | Busse ................................ | 210/231 |
| 3,655,056 | 4/1972 | Schotten et al. .................... | 210/227 |
| 3,737,041 | 6/1973 | Kitajima et al. .................... | 210/228 |

FOREIGN PATENTS OR APPLICATIONS

| | | | |
|---|---|---|---|
| 295,389 | 4/1965 | Netherlands................ | 285/DIG. 22 |
| 1,039,493 | 8/1957 | Germany .......................... | 210/231 |

Primary Examiner—Theodore A. Granger
Attorney, Agent, or Firm—Spencer & Kaye

[57] ABSTRACT

In a filter plate-and-diaphragm assembly, the marginal sealing zone of the diaphragm has a sealing rib received in a groove of the filter plate frame. During operation, the diaphragm, with the exception of the sealing zone, is lifted off the filter plate by a pressure medium introduced in a pressure chamber bounded by the diaphragm. The rib is situated in the vicinity of that edge of the sealing zone that is remote from the pressure chamber, so that an intermediate sealing zone of considerable width is disposed between the rib and the pressure chamber.

7 Claims, 6 Drawing Figures

FILTER PLATE-AND-DIAPHRAGM ASSEMBLIES FOR A FILTER PRESS

BACKGROUND OF THE INVENTION

This invention relates to a filter plate-and-diaphragm assembly that finds application in a plate-type filter press. The diaphragm is of the type that has, along its outer edge, a peripheral rib. The latter may be inserted into a complemental groove at the sealing edge of the filter plate for anchoring the diaphragm thereto. The filter press comprises a usually great number of such plate-and-diaphragm assemblies arranged in a face-to-face stacked series. Between each filter plate there is disposed a filter cloth, through which the filtrate passes. When the diaphragms are expanded by means of a pressure medium, the residue between the filter cloths is compressed, whereby a filter cake is obtained.

A known pressure diaphragm of the above-outlined type — as disclosed in German Offenlegungsschrift (Laid Open Application) No. 1,960,821 — is designed in such manner that the cross-sectional width of the rib provided on the diaphragm and the groove provided in the plate extend over the entire range of the diaphragm zone clamped between two adjoining filter plates. The diaphragm rib thus serves in its entirety as the sole sealing means.

In order to ensure a reliable seal between the diaphragm and the filter plate, a minimum sealing force (compression force) per unit area has to be present.

It is a disadvantage of a diaphragm designed in the above-outlined manner that the minimum sealing pressures have to be substantial in view of the fact that the diaphragm rib fills the entire groove in the filter plate and is of a very considerable width, resulting in a large sealing surface. The requirement for a high sealing pressure, however, necessitates a heavy construction of the filter press components proper. Further, the disadvantage has to be taken into account that the stroke of such filter presses during the compression of the plates is relatively large because the rib thickness, due to the substantial rib width has to be sufficiently great to ensure an effective anchoring of the diaphragm so that the latter does not separate from the groove. Accordingly, in known structures the amount of material used for the diaphragm to obtain a large cross-sectional area of the ribs is also substantial.

In view of the above, it has already been proposed to omit the anchoring ribs at the pressure diaphragms and to glue the diaphragms to the filter plate at the planar marginal diaphragm zones. Such a solution, however, is circumstantial, expensive and further has the disadvantage that during the compression of the components, due to the differences in hardness between the soft diaphragm edge and the hard plate edge, shearing stresses appear which may lead to the destruction of the diaphragm edge, or to a separation of the diaphragm from the filter plate, or to unsealed locations.

SUMMARY OF THE INVENTION

It is an object of the invention to eliminate the above-discussed disadvantages by providing an improved filter plate-and-diaphragm assembly in plate-type filter presses for improving the sealing of the diaphragm and yet allowing a reduction in the sealing pressures.

This object and others to become apparent as the specification progresses, is accomplished by the invention, according to which, briefly stated, the rib on the diaphragm and the complemental groove in the filter plate are arranged in the vicinity of that edge of the relatively wide marginal sealing zone of the diaphragm which is situated remote from the location (pressure chamber) where a pressure medium is applied for lifting the diaphragm off the filter plate. Thus, in otherwise known plate and diaphragm structures, the grooves and the ribs extend, according to the invention, in the vicinity of the outer edge of the diaphragm and the plate.

It follows from the above that the cross-sectional dimensions of the rib may be small. Thus, in a corresponding ratio of the height to the width of the rib, the height too may be smaller than heretofore because the unchanged width of the sealing face is disposed in a preponderant portion after the pressure side of the sealing face.

The object of the invention is fully accomplished by the structure according to the invention since, on the one hand, the sealing pressure is significantly reduced in the zone of the narrower rib under the same compression of faces and, on the other hand, there is achieved an effective pre-sealing by the remaining sealing face of the diaphragm. This remaining sealing face lies against the plate frame over a relatively large area and is only slightly deformed in thickness. Such a pre-sealing takes place before the pressure of the pressure medium can reach the diaphragm rib which is anchored in the groove provided in the filter plate frame. Consequently, the rib lies against the three profile faces under a relatively high pressure. In this manner an advantageous combined effect results from the pre-sealing in the zone of the wide sealing face and the principal sealing under the elevated pressure in the zone of the diaphragm rib and the plate groove.

It is noted that the sealing arrangement in this environment has to be based on two considerations: first, a seal has to be provided between the filtration space and the adjoining chamber of filter plate and, second, a seal has to be provided between the plate base and the diaphragm to isolate the pressure medium that serves to lift the diaphragm off the filter plate.

The sealing between the outer sealing faces of the diaphragm and the adjoining chamber or filter plate is generally effected by means of two interposed filter cloths. These filter cloths, because of their textile characteristics, particularly their woven web characteristics (that is, the overlying weft and warp threads) have the tendency to effect a transverse filtration that is, a "creeping" of the liquid. The sealing effect is secured here not so much by the specific sealing pressure than by the length of the sealing path in the longitudinal direction through the filter cloths; thus, a labyrinth-type seal is present.

With regard to the seal between base plate and the diaphragm, smooth and planar surfaces have to be sealed with respect to one another, so that in this case one seeks to obtain a relatively high sealing pressure per unit area. Such is the case when narrow sealing ribs are used, the height of which is greater than the depth of the groove in the filter plate.

In view of the above considerations, the invention constitutes an advantageous combination with an unexpected, heretofore unrecognized effect, particularly with respect to the aforenoted transverse filtration and results in a mutual, advantageous complementation of different effects.

The sealing effected according to the invention may be further improved by insuring that the cross-sectional height of the diaphragm rib is greater than the cross-sectional depth of the groove in the plate, since in this manner the sealing pressure is concentrated even stronger to the zone between the rib and the groove: the narrow rib is, because of its cross-sectional height that is greater than the groove depth, pressed into the latter even more strongly.

The diaphragm rib and the plate groove may have a dovetail section as known by itself in order to accomplish, on the one hand, a better anchoring of the diaphragm with respect to the plate in the open state of the filter press and, on the other hand, to achieve an increased sealing effect at the inclined faces and cross-sectional edges in the operational state of the filter press.

The anchoring, particularly during the mounting of the diaphragm to the plate and in the open condition of the filter plate, may be further improved by providing between the diaphragm rib and the plate groove a bounding medium, particularly a strip which is provided with an adhesive on both sides. This measure is particularly advantageous and sometimes even required in large-size diaphragms because, according to the invention, the cross-sectional dimensions of the rib are substantially smaller than in structures known heretofore. Thus, in case of heavier diaphragms, an anchoring alone may not be sufficient.

A further means for even better accomplishing the principal object of the invention, that is, an improvement of the sealing while simultaneously the sealing pressure is lowered, resides by maintaining uniform the thickness of that diaphragm portion which is disposed inwardly of the rib and is clamped between adjoining plates. In addition, there may be provided a sealing lip of the type shown, for example, in German Offenlegungsschrift (Laid Open Application) No. 2,002,302. This lip is located in the vicinity of the inner edge of the diaphragm zone clamped between adjoining plates and on that side of the diaphragm which is oriented away from the rib.

The invention, together with all the preceedingly described modifications may find application not only at the outer sealing edge of pressure diaphragms but also at the openings which are disposed in the zone of the wide sealing faces. These openings which also have to be mutually sealed, serve for the admission of the slurry, the wash water, the pressure medium and for the withdrawal of the filtrate.

DESCRIPTION OF THE PREFERRED EMBODIMENTS

Figure 1:
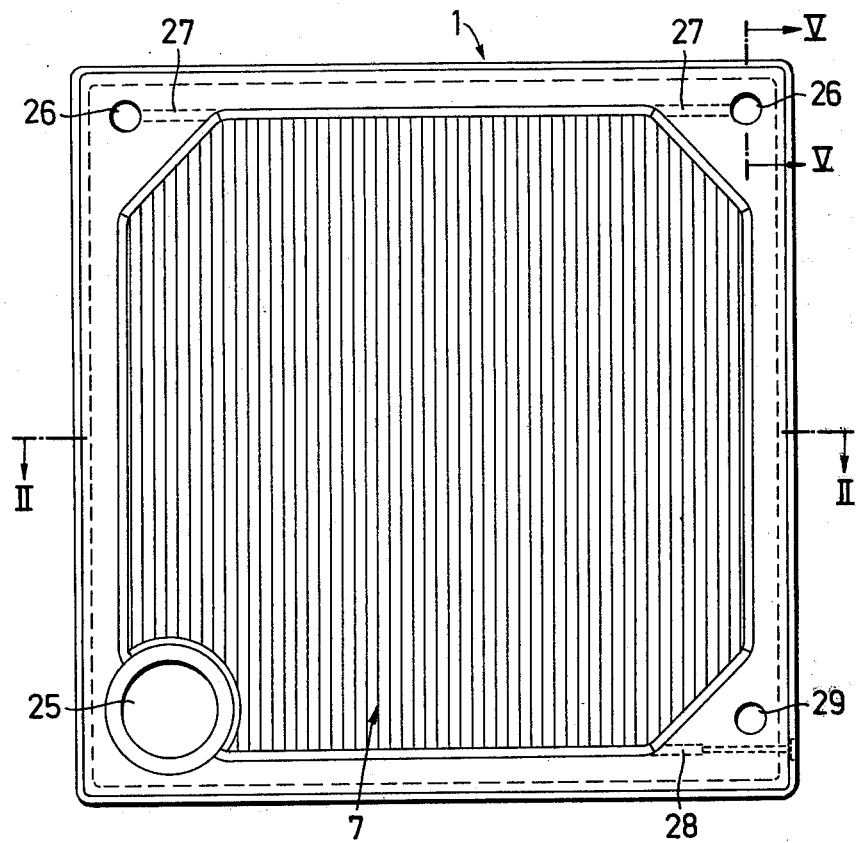
FIG. 1 is a broadside view of one filter plate-and-diaphragm assembly incorporating the invention.

Turning now to FIG. 1, there is illustrated one filter plate-and-diaphragm assembly. The filter press itself, which is not illustrated, comprises a great number of these assemblies arranged in a stacked, aligned relationship. These assemblies are adapted to be pressed together with a sealing pressure by a force-exerting mechanism forming part of the filter press.

The filter plate-and-diaphragm assembly essentially comprises a recessed (dish-shaped) filter plate generally indicated at 1, to at least one face of which there is attached a dish-shaped pressure diaphragm 7 which, in its relaxed condition, generally conforms to the shape of the filter plate 1.

Figure 2:
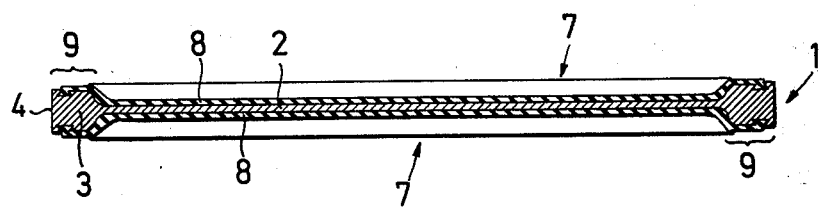
FIG. 2 is a sectional view along line II—II of FIG. 1.

FIG. 2 illustrates the filter plate-and-diaphragm assembly in section. It is seen that in this example, both sides of the filter plate 1 are provided with a pressure diaphragm 7. It may be further observed that the filter plate 1 comprises a depressed base 2 and a thickened, marginal portion which constitutes the plate frame 3. The peripheral edge face of the frame 3 is designated at 4. Further, the diaphragm 7 has a depressed base 8 which, in the non-pressurized (released) condition of the diaphragm 7, conforms to the face of the plate base 2 as shown in FIG. 2.

Figure 3:
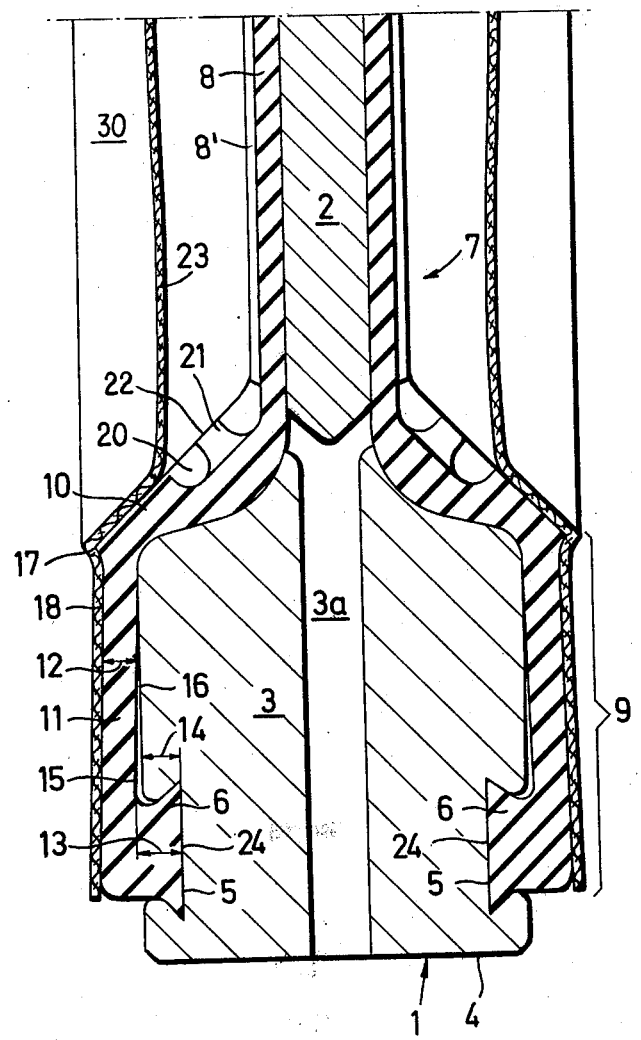
FIG. 3 is an enlarged view of an end portion of the sectional view illustrated in FIG. 2, showing additional details and illustrating the components in a released (non-operating) position.

Turning now to FIG. 3, there are illustrated in detail the components disposed in the zone of the plate frame 3.

The frame 3 further includes a channel 3a which extends from the edge face 4 within the frame 3 and terminates adjacent the frame 3 at the frame base 2. Channel 3a serves for introducing a pressure medium between the plate base 2 and the diaphragm base 8 for a purpose that will become apparent as the specification progresses.

The frame 3 is, in the vicinity of the peripheral edge face 4, provided with a dovetail-shaped groove 5. The groove 5 receives a dovetail-shaped rib 6 which is an integral part of the diaphragm 7 and which extends along the outer marginal zone thereof. The rib 6 may be bonded to the base of the groove 5 by a strip 24 provided with an adhesive on both sides.

On that side of the diaphragm 7 which is oriented away from the plate base 2, there is positioned a filter cloth 23 which, along its marginal zones, is clamped between two adjoining filter plates. The diaphragm base 8 is, on its face oriented towards the filter cloth 23, provided with channels 8' through which the filtrate may flow out as it will also be described in more detail later. The filter cloth 23 as well as all the other components illustrated in FIG. 3 are shown in their relaxed position, that is, no compressing sealing force is applied to the filter plate series and no pressure medium is introduced through the channel 3a.

The diaphragm 7 has a relatively wide sealing zone 9 which extends along the face 16 of the plate frame 3 and which, at its outer edge, includes a diaphragm rib 6. The sealing zone 9 is adapted to be clamped between the frames of two adjoining filter plates. The sealing zone 9 is connected in its inner edge with the diaphragm base 8 by means of a truncated pyramid-shaped connecting wall 10. Between the rib 6 and the wall 10 of the diaphragm 7, there extends, as part of the zone 9, an intermediate sealing zone 11 of a relatively large width and of a uniform thickness 12. The surface 15 of the zone 11 which is oriented towards the frame face 16 is planar and is adapted to sealingly cooperate with the frame face 16. The outer surface of the intermediate sealing zone 11 that is on the reverse side with respect to the surface 15, is designated at 18. The height 13 of the rib 6 is greater than the depth 14 of the groove 5 so that, as it may be observed from FIG. 3, in the released condition of the components, the planar sealing surface 15 of the diaphragm 7 extends at an acute angle with respect to the frame surface 16. The angle decreases to zero towards the wall 10. The diaphragm 7 is, at the location where the intermediate zone 11 changes into the wall 10, provided with a sealing lip 17. The latter is located at that side of the diaphragm 7 which is oriented away from the rib 6. By virtue of the lip 17, the surface 18 too, is disposed, in the released condition of the components, at an acute angle with respect to the adjoining face of the adjacent filter plate (not shown).

Prior to starting the filtering operation, the plurality of filter plate-and-diaphragm assemblies are pressed together with the sealing force exerted by the filter press. Upon application of this sealing force, the rib 6 and lip 17 will be deformed the most with respect to all other locations of the sealing zone 9 and thus the highest sealing pressures develop in the zones of components 6 and 17. The relatively soft diaphragm material is capable of lateral displacement without the appearance of significant shearing forces. By virtue of the above-described structural arrangement of the sealing portion of the diaphragm 7, the overall sealing pressure in the sealing zone 9 may be of reduced magnitude with respect to prior art structures. The compressed condition of the sealing zone 9 in response to the sealing force with which the filter plate stack is pressed together may be observed in FIG. 4.

After the sealing pressure has been applied as described above, the filter operation proper may be started by introducing the slurry to be filtered through an opening 25 (FIG. 1) provided in the filter plate 1. The slurry is admitted into the chamber 30 bounded by the filter cloth 23. The pressure of the slurry in the chamber 30 presses the filter cloth 23 against the base 8 of the diaphragm 7. It is noted that this position of the filter cloth 23 is not illustrated.

The filtrate passes from the chamber 30 through the filter cloth 23 and flows in the channels 8' provided in the diaphragm 7 towards the outlet channel 28 (FIG. 1) through which it is removed from the filter press as it flows out therefrom in the filtrate collecting port 29.

After a certain period of time, when for example, already a substantial amount of residue has accumulated in the chamber 30, a pressure medium, such as air or water, is introduced through the channel 3a. As a result, the diaphragm 7, inwardly of its sealing zone 9, is lifted off the plate base 2 together with the filter cloth 23. As it may be well observed in FIG. 4, there is thus now a pressure medium present in a pressure chamber 31 which is defined by those faces of the diaphragm portions 8 and 10 which are oriented towards the associated filter plate 1. It is noted that a deformation of the connecting wall 10 of the diaphragm 7 and thus its movement away from the filter plate 1 in response to the pressure in channel 3a is facilitated by the channels 20 and 21. As it may also be observed in FIG. 4, the filter cloth 23 lies against the projections 22 bounding the longitudinal and transverse channels 20 and 21.

As a consequence of pressing the filter cloths together in the filter press by the diaphragms, the residue in the chamber 30 is compressed and thus a filter cake is obtained. The additional filtrate leaving the chamber 30 through the filter cloth 23 as a result of the pressure applied in chamber 31 may flow out into the filtrate outlet port 29 through the longitudinal channels 20 transverse channels 21 provided in the diaphragm wall 10.

Figure 4:
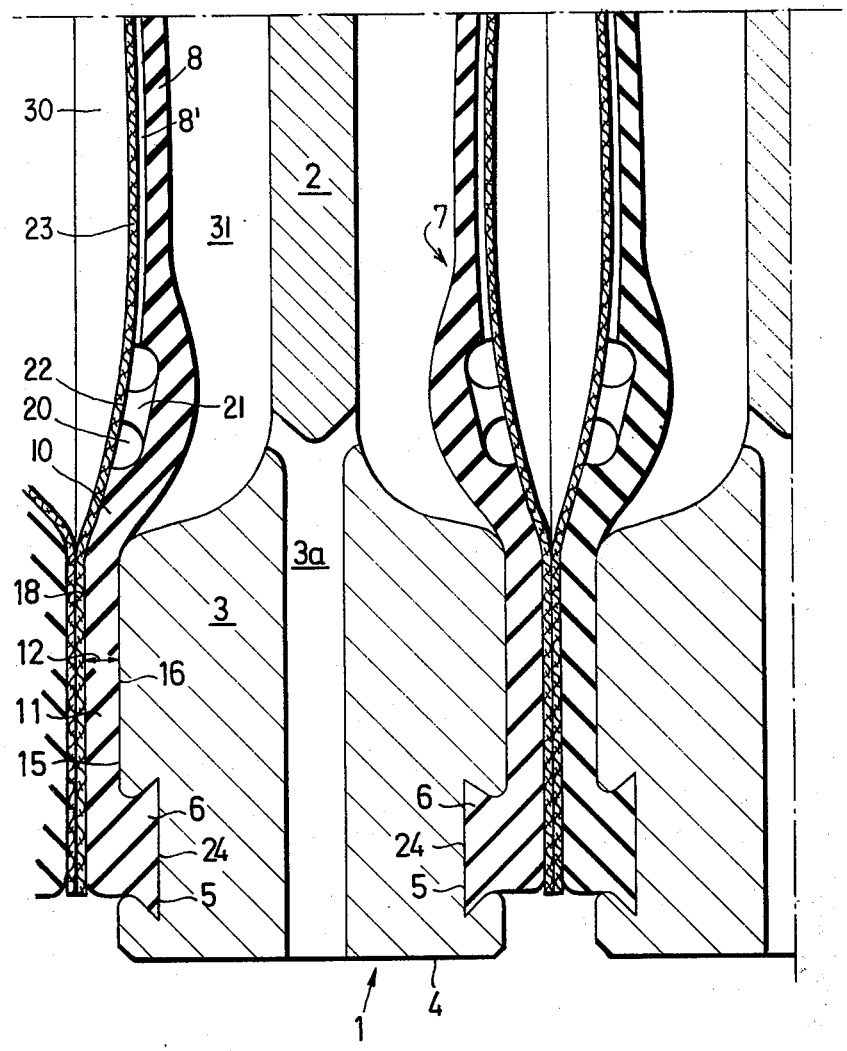
FIG. 4 is a view similar to that of FIG. 3, but showing the components in a compressed and pressurized condition.

As it may be further observed for FIG. 4, the rib 6 of the diaphragm 7 is disposed along that edge of the sealing zone 9 which is remote from the pressure chamber 31. Stated in different terms, the pressure chamber 31 and the rib 6 are separated from one another by the relatively wide intermediate sealing portion 11 of the sealing zone 9 of the diaphragm 7.

Subsequent to the formation of the filter cake, the pressure medium is removed from the chamber 31 and thus, by virtue of its resiliency, the diaphragm 7 again conforms to the surface of the filter base 2 thus reducing the volume of the pressure chamber 31 substantially to zero. The filter cloth 23 remains adhered to the filter cake. Thereafter, wash water is introduced into the space between the diaphragm base 8 and the filter cloth 23 through ports 26 and channels 27 (FIG. 1).

Figure 5:
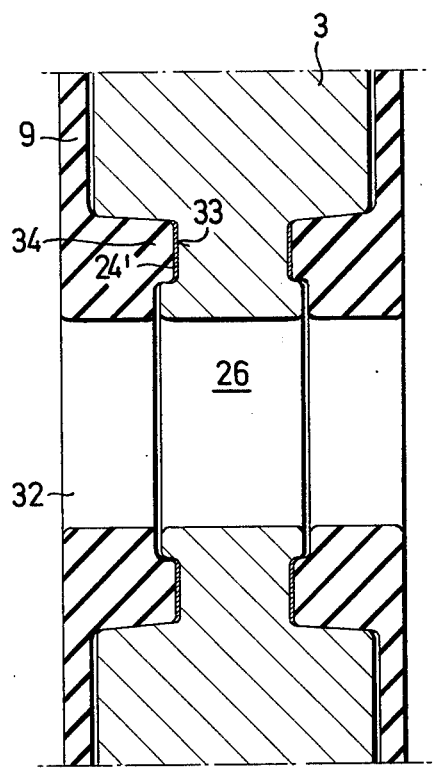
FIG. 5 is an enlarged sectional view of one embodiment taken along line V—V of FIG. 1.

Turning now to FIG. 5, there is illustrated a sealing arrangement of the diaphragm 7 in the zone of the wash water inlet port provided in the filter plate 1. As seen, with the port 26 provided in the frame 3 of the filter plate 1, there is aligned an opening 32 provided in the sealing zone 9 of the diaphragm 7. In the frame 3 there is provided a groove 33 which surrounds the port 26 and which receives a rib 34 provided in the sealing zone 9 and surrounding the opening 32. A bond between the rib 34 and the groove 33 is ensured, for example, by a strip 24' which is provided with an adhesive on both sides.

Figure 6:
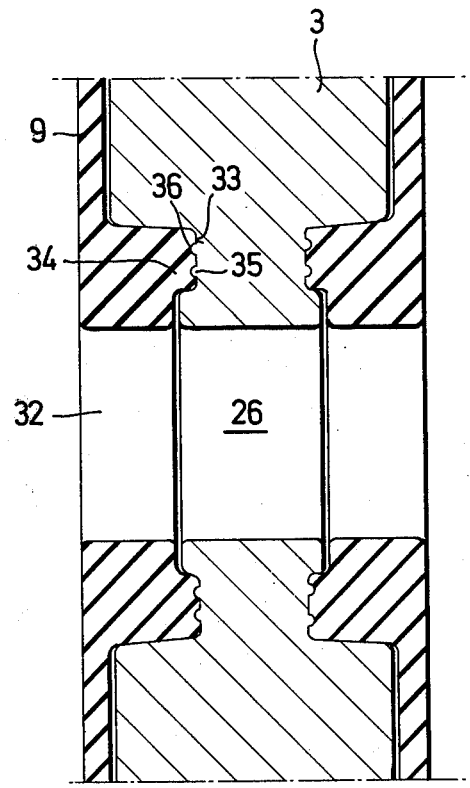
FIG. 6 is an enlarged sectional view of another embodiment taken along line V—V of FIG. 1.

Turning now to FIG. 6, there is shown a modified sealing arrangement in the zone of the wash water port 26. According to this embodiment, the anchoring of the diaphragm 7 in this zone is effected by the cooperation between the rib 34 and the groove 33 with the aid of auxiliary ribs 35 provided in the base of groove 33 and auxiliary grooves 36 provided in the rib 34.

It will be understood that the above description of the present invention is susceptible to various modifications, changes and adaptations, and the same are intended to be comprehended with-in the meaning and range of equivalents of the appended claims.

We claim:

1. In a filter plate-and-diaphragm assembly of the type including a filter plate having a base and a marginally extending frame, the frame having a sealing face; a pressure diaphragm having a dished base and a marginally extending sealing zone lying over the sealing face of the frame; the sealing zone including a sealing face oriented toward and adjoining the sealing face of the frame; means provided in said filter plate for introducing a pressure medium between the diaphragm base and the plate base; a portion of the diaphragm and a portion of the filter plate together defining between themselves and inwardly of the sealing zone, a pressure chamber for the pressure medium, the improvement comprising:
   a. means defining a groove in said frame;
   b. a rib forming part of said diaphragm and received in said groove, said rib being situated in said sealing zone adjacent an edge thereof, said edge being remote from said portions defining said pressure chamber, whereby said sealing face of said diaphragm being disposed between said rib and said portions defining said pressure chamber;
c. means defining open channels on that side of the diaphragm base that is oriented away from the plate base;
d. a truncated pyramidal portion forming part of said diaphragm and connecting said sealing zone of said diaphragm with the diaphragm base; and
e. means defining a plurality of additional open channels in said truncated pyramidal portion, said additional open channels being oriented away from the plate base.

2. In a filter plate-and-diaphragm assembly of the type including a filter plate having a base and a marginally extending frame, the frame having a sealing face; a pressure diaphragm having a dished base and a marginally extending sealing zone lying over the sealing face of the frame; the sealing zone including a sealing face oriented toward and adjoining the sealing face of the frame; means provided in said filter plate for introducing a pressure medium between the diaphragm base and the plate base; a portion of the diaphragm and a portion of the filter plate together defining between themselves and inwardly of the sealing zone, a pressure chamber for the pressure medium; means defining a groove in said frame; and a rib forming part of said diaphragm and received in said groove; the improvement wherein said rib is situated in said sealing zone adjacent an edge thereof, said edge being remote from said portions defining said pressure chamber for positioning said sealing face of said diaphragm between said rib and said portions defining said pressure chamber; the diaphragm portion which carries said sealing face has a uniform thickness; said rib and said groove having a dovetail-shaped section; and said rib having a height that is greater than the depth of said groove.

3. An assembly as defined in claim 2, including adhesive means bonding said rib to said groove.

4. An assembly as defined in claim 3, wherein said adhesive means constitutes a strip provided with an adhesive on both sides, said strip being disposed in said groove.

5. An assembly as defined in claim 2, including a projecting lip provided on said diaphragm along a further edge of said sealing zone, said further edge being remote from said rib, said lip being situated on the reverse side of said diaphragm with respect to said rib.

6. An assembly as defined in claim 2, said filter plate further having means defining a throughgoing opening in said frame, the improvement further comprising:
c. means defining an additional groove in said frame about said opening;
d. means defining an opening in said sealing zone in alignment with the opening in said frame; and
e. an additional rib surrounding said opening in said sealing zone and received in said additional groove.

7. An assembly as defined in claim 6, wherein said additional groove and said additional rib have at least one interengaging auxiliary rib and auxiliary groove.

* * * * *